A. FOUBERT.
Oil Still.
No. 60,166.
Patented Dec. 4, 1866.
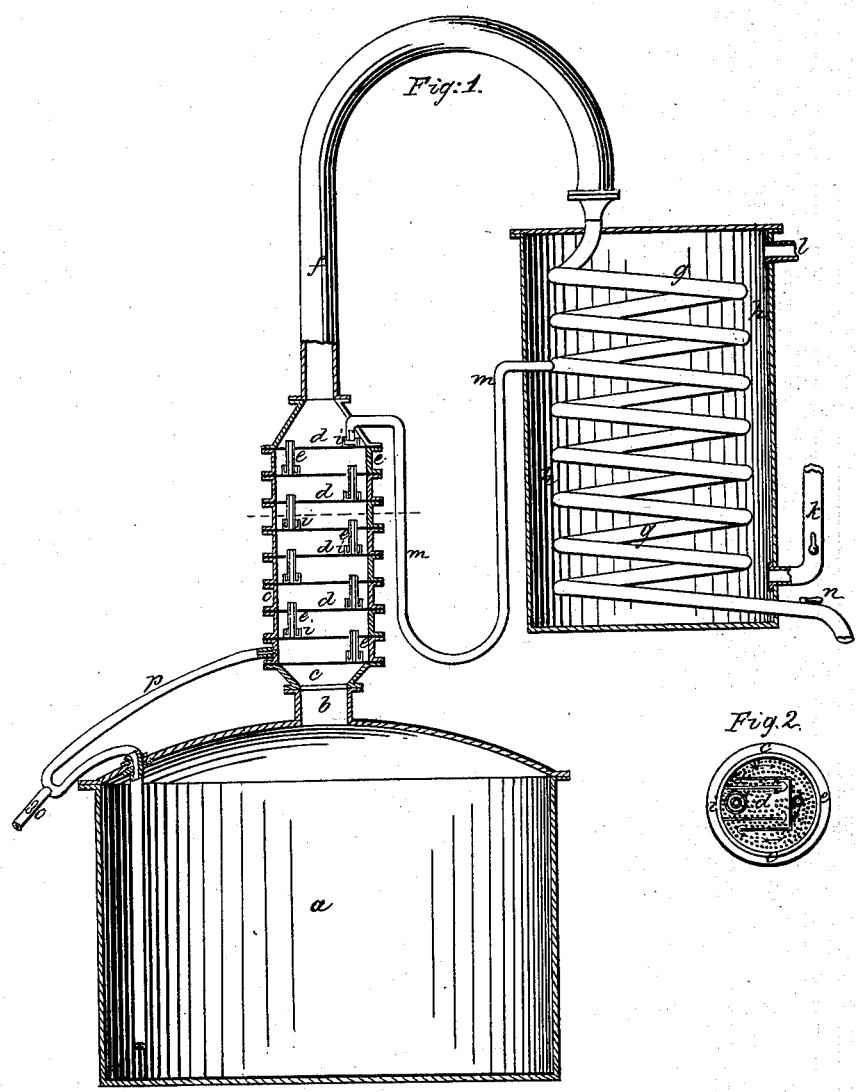
Witnesses:
Chas. H. Smith
Geo. L. Walker
Inventor:
André Foubert

United States Patent Office.

IMPROVEMENT IN DISTILLING AND REFINING OILS, WINES, AND OTHER LIQUIDS.

ANDRE FOUBERT, OF NEW YORK, N. Y.

Letters Patent No. 60,166, dated December 4, 1866.

SPECIFICATION.

TO ALL WHOM IT MAY CONCERN:

Be it known that I, ANDRÉ FOUBERT, of the city and State of New York, have invented and made a certain new and useful Improvement in Distilling and Refining Oils, Wines, and other Liquids; and I do hereby declare the following to be a full, clear, and exact description of the said invention, reference being had to the annexed drawing, making part of this specification, wherein—

Figure 1 is a vertical section of my said apparatus; and

Figure 2 is a sectional plan of the rectifying column.

Similar letters refer to the same parts.

In the distillation of petroleum and liquids generally, there are different ingredients that are evaporated by varying degrees of temperature, and hence can be separated by the application of heat. The object of my invention is to bring the vapors passing off from the still into direct contact with the liquid of condensation, in order that the temperature may be progressively of a less temperature from the still to the condenser, and hence only the easily evaporated portions will pass away to the condenser, and the liquids evaporating at a higher temperature pass back into the still, or be drawn off separately.

The nature of my said invention consists in a rectifying or refining column formed with a series of perforated diaphragms, upon the surface of which the condensed liquid passes, and through which the vapors from the still pass in jets. And I construct my condenser so that all the liquid condensed therein to a given point, flows back into this column, while the condensation beyond that point passes away separately; thus the liquid that is evaporated easily passes off by the condenser, and the less easily evaporated liquid passes back into the column and is drawn away from that, or allowed to pass into the still.

In the drawing, $a$ is the still, of any usual construction and heated in any desired manner. $b$ is a pipe leading to the vertical column, $c$, in which are a series of diaphragms, $d\,d$, each one being formed of sheet metal with numerous fine perforations. $e\,e$ are pipes, the upper ends of which are about one inch above the surfaces of the respective diaphragms, and each pipe terminates at its lower end within a cup, $i$, on the diaphragm below. $f$ is a pipe to the condenser-worm, $g$, within the vessel $h$. $k$ is a pipe supplying water near the bottom of the condenser, and $l$ is an overflow pipe. The pipe $m$ connects with the worm $g$, near the middle portion thereof, and conveys the liquid condensed above that point back into the upper cup, $i$, on the series of diaphragms, $d$, so that the liquid shall flow over those diaphragms successively from the top one to the bottom one, the vapors passing off from the still going through the perforations of the diaphragms and the layer of liquid resting upon them. The force of vapor will prevent the liquid running through the perforations of the diaphragm, and in order to insure a more uniform distribution and circulation of said liquid, I employ the vertical flanges shown in fig. 2, between which the liquid circulates, as indicated by the arrows, from the cup $i$ to the overflow pipe $e$.

In the distillation of petroleum the oil will be returned to the column and to the still, if necessary, until the volatile portions are entirely removed and pass away in the form of liquid at the cock, $n$, and the less volatile burning oil is drawn off at the cock $o$, or, if desired, that cock may be closed, and the bend at the lower end of the pipe, $p$, filling with liquid, the same will run back into the still, $a$. A similar operation is performed in the distillation of wines and alcohol: the more easily evaporated portions and high-proof alcohols pass off by the cock, $n$, and the less volatile portions are returned to the still, or drawn off by the cock $o$.

What I claim, and desire to secure by Letters Patent, is—

1. The column $c$, containing the perforated diaphragms $d\,d$, in combination with the worm or condenser $g$, and pipe $m$, passing back to the column $c$, as and for the purposes set forth.

2. I claim the flanges or divisions upon the perforated diaphragms to cause the liquid to circulate from the cup $i$ to the pipe $e$, in the manner specified.

In witness whereof I have hereunto set my signature this second day of October, A. D. 1866.

ANDRÉ FOUBERT.

Witnesses:
GEO. D. WALKER,
CHAS. H. SMITH.